Patented Oct. 2, 1928.

1,685,954

UNITED STATES PATENT OFFICE.

SATARO MORIMOTO, OF MINAMIKATSUSHIKA-GUN, TOKYO-FU, JAPAN.

METHOD OF FIXING A THIN LAYER OF SPONGE RUBBER TO THE SURFACE OF INDIA-RUBBER GOODS.

No Drawing. Application filed April 14, 1927, Serial No. 183,907, and in Japan June 24, 1926.

The present invention relates to a method of fixing a thin layer of sponge rubber to the surface of india rubber goods, in which the india rubber solution obtained by dissolving unvulcanized india rubber in suitable solvent such as benzine, naphtha etc., and adding to this solution ordinary mixtures and the materials which convert ordinary india rubber into spongy rubber, is applied to the surface of unvulcanized india rubber goods and the whole is cured by hot process.

The object of my invention is to provide rubber goods which have a very thin outer or inner layer of sponge rubber by an extremely simple method at comparatively low cost.

The invention may clearly be understood by the following example for making finger sacks.

Six hundred parts of unvulcanized india rubber, one hundred parts of zinc white, eight parts of lithopone, eight parts of sulphur, five parts of ammonium carbonate, seven parts of white substitute, two parts of colouring matters, and one hundred and forty parts of spindle oil are mixed thoroughly by passing between mixing rollers. The mixture is dissolved in carbon disulphide, and then diluted with naphtha; thus an india rubber solution is obtained which is to make sponge rubber. On the other hand, by dipping several times a mould of finger sack in ordinary india rubber solution, a layer of unvulcanized rubber of suitable thickness is fixed on the surface of the mould.

The rubber layer of the mould is then covered with an additional thin layer, by dipping the mould in the above mentioned sponge rubber solution a few times and by curing the whole by hot process, a thin layer of sponge rubber being fixed to the surface of the finger sack.

I claim:—

A method of fixing a thin layer of sponge rubber to the surface of india rubber goods, in which the india rubber solution obtained by dissolving unvulcanized india rubber in a suitable solvent and adding to this solution ordinary mixtures and the materials which convert ordinary india rubber into spongy rubber, is applied to the surface of unvulcanized india rubber goods and then the whole is cured by hot process, as set forth.

In witness whereof I have signed this specification.

SATARO MORIMOTO.